US009144872B2

(12) United States Patent
Meidar et al.

(10) Patent No.: US 9,144,872 B2
(45) Date of Patent: Sep. 29, 2015

(54) TOOL TURRET FOR PROCESSING WORKPIECES AND PROCESSING SYSTEM WITH THIS TYPE OF TOOL TURRET

(76) Inventors: Moshe Israel Meidar, New York, NY (US); Wolfgang Horn, Goppingen (DE); Heiner Lang, Pforzheim (DE); Waldemar Haus, Winnenden (DE)

(*) Notice: Subject to any disclaimer, the term of this patent is extended or adjusted under 35 U.S.C. 154(b) by 924 days.

(21) Appl. No.: 13/354,721

(22) Filed: Jan. 20, 2012

(65) Prior Publication Data
US 2012/0186053 A1    Jul. 26, 2012

(30) Foreign Application Priority Data

Jan. 21, 2011   (DE) .......................... 10 2011 003 005

(51) Int. Cl.
*B23B 29/24*   (2006.01)
*B23Q 11/10*   (2006.01)
*B23B 29/32*   (2006.01)

(52) U.S. Cl.
CPC .......... *B23Q 11/1053* (2013.01); *B23B 29/323* (2013.01); *B23Q 2220/002* (2013.01); *Y10S 29/05* (2013.01); *Y10S 29/092* (2013.01); *Y10S 82/90* (2013.01); *Y10T 29/5154* (2015.01); *Y10T 29/5155* (2015.01); *Y10T 82/2587* (2015.01)

(58) Field of Classification Search
CPC ............ Y10T 29/5154; Y10T 29/5155; Y10T 82/2587; Y10S 82/90; Y10S 29/05; Y10S 29/092; B23Q 11/1053
USPC ............ 29/39–40, DIG. 50, DIG. 92; 82/159, 82/900
See application file for complete search history.

(56) References Cited

U.S. PATENT DOCUMENTS

| | | | | |
|---|---|---|---|---|
| 2,940,473 | A | * | 6/1960 | Smith ........................... 137/883 |
| 3,829,103 | A | * | 8/1974 | Sussman ....................... 277/500 |
| 5,265,505 | A | * | 11/1993 | Frechette .......................... 29/39 |
| 5,509,335 | A | | 4/1996 | Emerson |
| 6,564,682 | B1 | | 5/2003 | Zurecki et al. |

FOREIGN PATENT DOCUMENTS

| | | |
|---|---|---|
| DE | 3310034 A * | 9/1984 |
| DE | 3702424 A1 | 8/1988 |
| DE | 4205273 C1 | 12/1992 |

(Continued)

OTHER PUBLICATIONS

Machine Translation of DE 4205273, which DE '273 was published Dec. 1992.*

(Continued)

*Primary Examiner* — Erica E Cadugan
(74) *Attorney, Agent, or Firm* — Reising Ethington P.C.

(57) ABSTRACT

A tool turret for machining workpieces has a housing and with a part that can be rotated around an axis of rotation into several rotary positions. On the rotating part, several tool holders are mounted on the circumference for holding tools to which a cryogenic cooling medium can be fed by means of a first feed line and a respective second feed line. The first feed line can be moved in a linear manner in at least some sections by linear actuator whereby the first feed line is connected in a first position with the second feed line belonging to the tool in work position and in a second position is disconnected from the second feed lines for changing the rotary position of the rotating part. The tool turret enables the cryogenic cooling medium to be fed to the tools in a simple and reliable manner.

9 Claims, 11 Drawing Sheets

(56) References Cited

FOREIGN PATENT DOCUMENTS

| | | | |
|---|---|---|---|
| DE | 4290891 | T1 | 5/1993 |
| DE | 19735420 | A1 | 2/1999 |
| DE | 60111162 | T2 | 10/2005 |
| EP | 1208940 | A2 | 5/2002 |
| WO | 9217315 | A1 | 10/1992 |
| WO | WO-03/035322 | A1 * | 5/2003 |

OTHER PUBLICATIONS

Machine Translation of DE 3310034, which DE '034 was published Sep. 1984.*

PCT/EP2012/050859 International Search Report and Written Opinion; Dated: Mar. 23, 2012; 4 pages.

* cited by examiner

TOOL TURRET FOR PROCESSING WORKPIECES AND PROCESSING SYSTEM WITH THIS TYPE OF TOOL TURRET

FIELD

The invention relates to a tool turret in which a plurality of tools are mounted and in which cryogenic coolant can be provided to the tool in the turret that is being used to machine a workpiece.

BACKGROUND

DE 601 11 162 T2 (corresponds to EP 1 208 940 B1) discloses a machine tool with a tool turret for the machining of metallic workpieces. Through the tool turret, a cryogenic cooling medium is carried to the respective tool that is momentarily in engagement with the workpiece to be machined. For this purpose, the tool turret has a polymer rotor with a first thermal expansion coefficient and an associated metallic stator with a second thermal expansion coefficient. A first feed line runs through the stator, which has a first section running concentrically to the axis of rotation of the rotor and a second line section running radially with respect to the rotary axis. In the working position of the respective tool, the first feed line is connected to an associated second feed line that runs through the rotor, which surrounds the stator, to the tool. Because of the different thermal expansion coefficients, the feed lines are automatically sealed at the connecting points when the cryogenic cooling medium flows through the feed line to the respective tool. The problem with this tool turret is that it is difficult to seal the connection between the feed lines since, on the one hand, the stator must be pressed with adequate force against the rotor for sealing the connection because of the different expansion coefficients, but on the other hand, the force must not be too high since otherwise the tool turret jams and a tool change is no longer reliably possible. This is especially a problem if a cryogenic cooling medium and/or different cryogenic cooling media with different temperatures are used, since the expansion behavior of the stator and the rotor can be dissimilar.

The invention is based on the object of producing a tool turret in which a cryogenic cooling medium can be supplied to the tools in a simple and reliable manner.

This object is achieved by a tool turret with a first feed line that can be moved, at least in sections, by means of a linear actuator parallel to the rotary axis so that a simple and reliable transfer of the cryogenic cooling medium is possible up to the tool that is in engagement with the workpiece to be processed and, in addition, a simple and reliable tool change is possible. The first feed line is connected so that in its first position it is sealed with the second feed line of the associated tool of which is currently in the work position for machining the workpiece. The cryogenic cooling medium can be transferred simply and reliably to the tool. For a tool change, the first feed line is moved by means of the linear actuator into its second position, in which the first feed line is disconnected from the second feed lines. In the second position, the rotary position of the rotating part with the tool holders is thus simply and reliably changed for the tool change. After the tool change, the first feed line is moved again by means of the linear actuator into the first position in which it is connected and sealed with the second feed line of the new tool located in the work position.

The tool turret according to the invention makes possible a simple and reliable feed of a cryogenic cooling medium independently of its temperature. At the outlet of the respective tool, the cryogenic cooling medium has a temperature of less than −60° C., and may be less than −120° C., and may be less than −150° C., and may be less than −180° C. As cryogenic cooling medium, for example liquid or gaseous nitrogen, liquid or gaseous oxygen, gaseous hydrogen, gaseous helium, liquid or gaseous argon, gaseous carbon dioxide and liquid or gaseous natural gas can be used. Preferably nitrogen is guided through the feed lines to the tools. In addition—if necessary—a non-cryogenic cooling lubricant can also be supplied through the tool turret to the respective tool.

Because of the fact that the cryogenic cooling medium is supplied directly up to the cutting edge of the tools and these are effectively cooled because of the extremely low temperature of the cryogenic cooling medium, higher cutting speeds during workpiece machining are possible in comparison to the usual cooling lubricants. In addition, the cryogenic cooling medium has a positive effect on the service lives of the tools. The productivity and cost-effectiveness of the workpiece machining can be increased correspondingly by the supply of the cryogenic cooling medium to the cutting of the tools. Since the cryogenic cooling medium evaporates, neither the processed workpieces nor the tool turret and/or the entire machine tool becomes soiled. Disposal of the cryogenic cooling medium as is required with the usual cooling lubricants is no longer necessary, whereby the cost-effectiveness of the workpiece machining is even further improved.

In a simple manner, the tool turret ensures that the cryogenic cooling medium is not heated to an undesirable extent on the way to the tools and the components of the tool turret surrounding the first feed line do not cool to an extent that is not permissible. In this way, the tools can be extremely effectively cooled and at the same time thermal tensions in the components surrounding the first feed line can be prevented. Preferably, the first feed line is designed so that it is completely insulated, i.e. thermally insulated over the entire length. For example, the feed line has an inner pipe and an outer pipe surrounding it that is connected with it at the end. The insulation space defined by the pipes is filled, for example, with an insulation medium. If the first feed line is designed so that it is vacuum-insulated, the insulation space is evacuated, whereby the feed line has an extremely low specific heat conductivity. The first feed line may have a specific heat conductivity at 0° C. of max. 0.40 W/(mK) [watts per meter Kelvin], especially of max. 0.30 W/(mK) and especially of max. 0.20 W/(mK). If the first feed line is designed so that it is vacuum-insulated, its specific heat conductivity is extremely low and at 0° C. is maximum 0.01 W/(mK). Preferably the second feed lines are also thermally insulated, at least in sections, and may be vacuum-insulated. The statements for the first feed line then also apply to the second feed lines.

The tool turret makes possible a compensation of the different length changes of the inner and outer pipes. If the first feed line has the cryogenic cooling medium flowing through it, the inner pipe essentially assumes its temperature, while in contrast the outer pipe cools less because of the insulation medium arranged between the two pipes. The inner pipe changes its length more than the outer pipe. In order to prevent damage of the first feed line, at least one of the pipes must have a changeable length. Preferably the outer pipe has a serpentine shaped metal boot for thermal length compensation. In particular, the second feed lines also each have an inner pipe and an outer pipe surrounding them, whereby at least one of these pipes is changeable in length. The statements regarding the first feed line apply equally to the second feed lines designed in this way.

The tool turret ensures high thermal insulation of the two feed lines in order to prevent undesirable heating of the cryogenic cooling medium on the way to the tools. Preferably the second feed lines are each completely insulated, i.e. thermally over the entire length. Otherwise the statements regarding the first feed line apply equally to the second feed line.

The tool turret makes possible, in a simple manner, a connecting and disconnecting of the feed lines for transferring the cryogenic cooling medium and for a tool change. For connecting the feed lines, the first feed line is displaced in a linear manner in a first direction by means of the double-acting piston-cylinder unit, while in contrast for tool change the first feed line is displaced in a linear manner by means of the piston-cylinder unit in a second, opposite direction. Preferably the piston-cylinder unit can be actuated pneumatically or hydraulically. The respective position of the piston-cylinder unit is preferably detected by means of at least one sensor.

The tool turret ensures a simple and reliable connection of the feed lines. Because of the funnel-shaped design, the first feed line can be introduced in a simple way into the second feed line and sealed at the connecting point. For this purpose, for example after the funnel-shaped end section, a gasket can extend into the respective second feed line through which the first feed line is introduced. In addition, the funnel-shaped end section itself is designed as a gasket. The gaskets have an especially high resistance to the cryogenic cooling medium. Preferably the gaskets are made of a plastic material and/or a rubber material that has high chemical resistance and good thermal insulation properties. Preferably the gaskets are made of PTFE (polytetrafluoroethylene).

The tool turret ensures a simple feed of the cryogenic cooling medium. Because of the fact that the first feed line is at a distance from the axis of rotation, i.e. preferably outside the housing, the second feed lines can be designed so they are extremely short.

In a second embodiment, the tool turret ensures a simple and reliable feed of the cryogenic cooling medium to the tools. Because of the fact that the respective first line section runs parallel to the axis of rotation, the first feed line can be connected to the respective second feed line by a simple linear movement. Since the respective second line section runs perpendicularly and/or radially with respect to the axis of rotation, the cryogenic cooling medium is supplied directly up to the cutting edge of the tools.

In the second embodiment, because of the design of the first feed line, only the second line section is moved perpendicularly and/or radially with respect to the axis of rotation by means of the linear actuator. The first line section that runs concentrically to the axis of rotation is mounted fixed in the axial direction. Since neither the first line section nor the second line section is formed in the rotating part, these are also fixed during a rotation of the rotating part. Because of the arrangement of the first feed line, the structure of the tool turret is extremely compact.

In the second embodiment, because of the fact that the second feed lines each run exclusively perpendicularly and/or radially with respect to the axis of rotation, the cryogenic cooling medium can be guided directly to the cutting edge of the tools.

In the second embodiment, the tool turret ensures, in a simple and reliable manner, a cooling of rotary-drivable tools. The tool mount that is rotary-drivable by means of the drive motor is rotary driven around the associated second feed line, which is arranged concentrically to the tool axis of rotation and does not rotate with the tool mount around the tool axis of rotation. Thus, by means of the tool mount, the tool can be rotary driven around the associated tool axis of rotation and at the same time, in a simple and reliable manner, the cryogenic cooling medium can be supplied to the cutting edge of the rotary driven tool. For example, as a rotary-driven tool, a drill can be used in the tool mount which is driven together with the drill. In addition, tools can also be used in the tool mount that are not rotary driven. For example, in the tool mount, a lathe chisel can be used as a tool, which during the machining is not rotary driven by means of the drive unit, i.e., is fixed around the tool axis of rotation.

In the second embodiment, the tool turret ensures a reliable feed of the cryogenic cooling medium since the respective second feed line does not rotate around the tool axis of rotation and, corresponding to the first feed line, is arranged fixed around the tool axis of rotation.

The invention is also based on the object of producing a machining system that makes possible a simple and reliable feed of the cryogenic cooling medium to the tools.

The advantages of the machining system according to the invention correspond to the advantages already described of the tool turret. From the thermally insulated reservoir, the cryogenic cooling medium is fed through the thermally insulated supply line to the tool turret. In order to keep the temperature of the stored cryogenic cooling medium constant, a cooling unit is provided. In addition, the machining system has a feed pump to pump the cryogenic cooling medium from the reservoir to the tool turret. For the tool change, the machining system also has a shutoff valve that interrupts the supply of the cryogenic cooling medium to the tool turret before a tool change. The cooling unit and/or the feed pump and/or the shutoff valve can be controlled by means of a control device. The machining system is part of an otherwise usual machine tool for the machining of metallic workpieces, especially of shaft-like workpieces.

Other characteristics, advantages and details of the invention will be seen from the following description of several exemplary embodiments.

DETAILED DESCRIPTION

Figure 1:
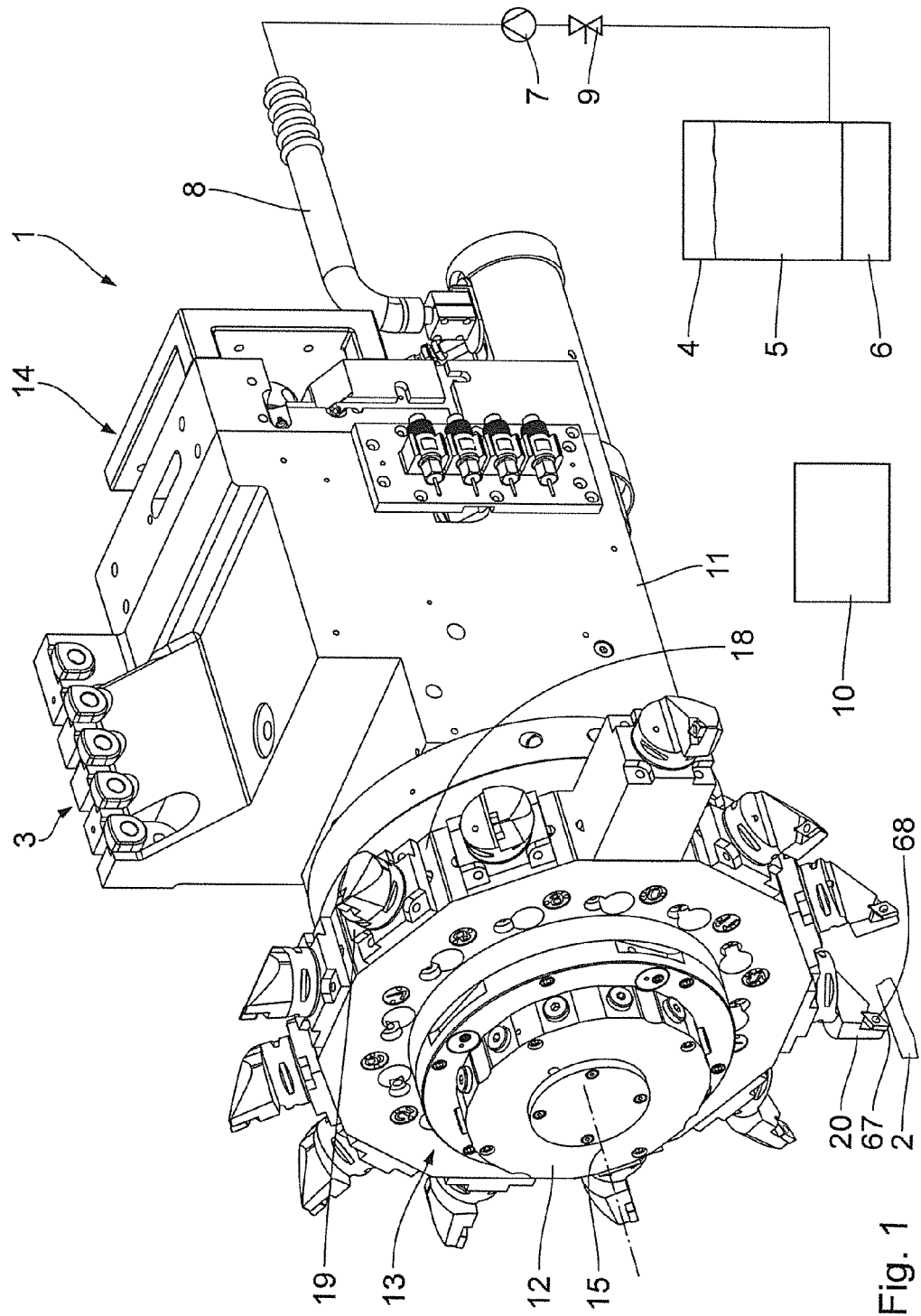
FIG. 1 is a perspective view of a machining system for machining workpieces with a feed of a cryogenic medium according to a first exemplary embodiment.

A first embodiment of the invention is described with reference to FIGS. 1 to 6. A portion of a machine tool is shown which has a machining system 1 for the machining of metallic workpieces 2 that comprises a tool turret 3, a thermally insulated reservoir 4 for providing a cryogenic cooling medium 5, a cooling unit 6 for cooling the cryogenic cooling medium 5, a feed pump 7, a supply line 8 with the associated shutoff valve 9 and a control unit 10. The supply line 8 is connected to the reservoir 4 and the tool turret 3 and is thermally insulated. The tool turret 3, the cooling unit 6, the feed pump 7 and the shutoff valve 9 can be controlled by means of the control unit 10. The structure of the machining system 1 that goes beyond the machine tool portion that is shown in the drawing is old and well known.

The tool turret 3 has a housing 11, in which a fixed central shaft 12 is mounted. The central shaft 12 extends out of the housing 11 on one side and is used for mounting a rotary part 13 that can be driven around an axis of rotation 15 by means of a drive unit 14 mounted on the housing. The drive unit 14 comprises an electrical drive motor 16 that works, together with a mechanical transmission unit 17 to rotate the rotary part 13 around the axis of rotation 15.

The rotary part 13 is designed with a ring shape and mounted concentrically to the axis of rotation 15 on the central shaft 12. The rotating part 13 has a polygonal outer contour that is formed by bearing surfaces 18 arranged on the outer circumference. On the bearing surfaces 18, tool mounts 19 are arranged in which the tools 20 are held and secured by means of a well known interlock mechanism. The rotary part 13 can be swiveled into several defined rotary positions by means of the drive unit 14, in which in each case one of the tools 20 is located in work position in which it is turned toward the workpiece 2 to be machined.

Figure 2:
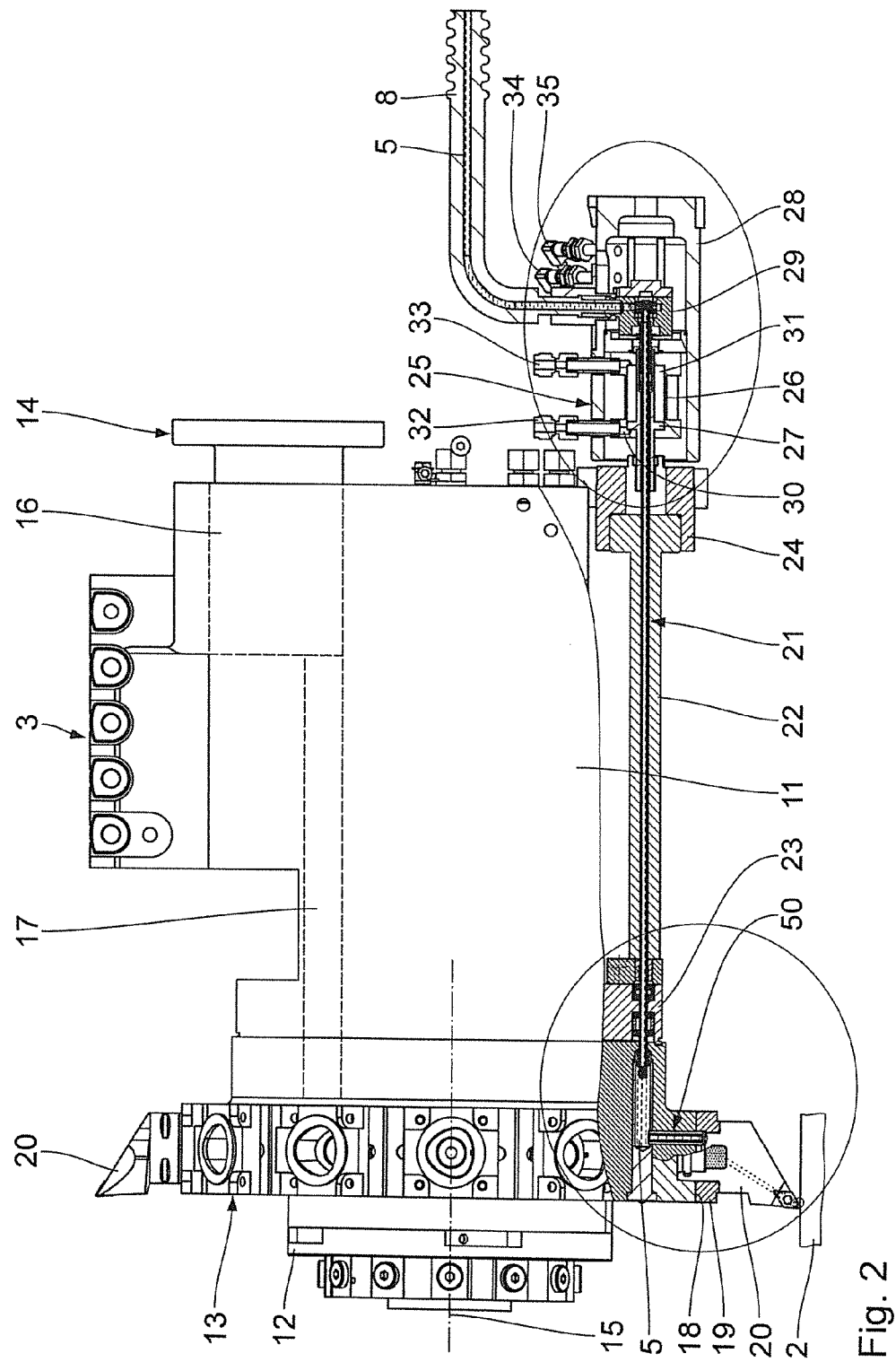
FIG. 2 shows a side view partly in section showing a tool turret of the machining system in FIG. 1 in an operating position for feeding the cryogenic cooling medium.
Figure 3:
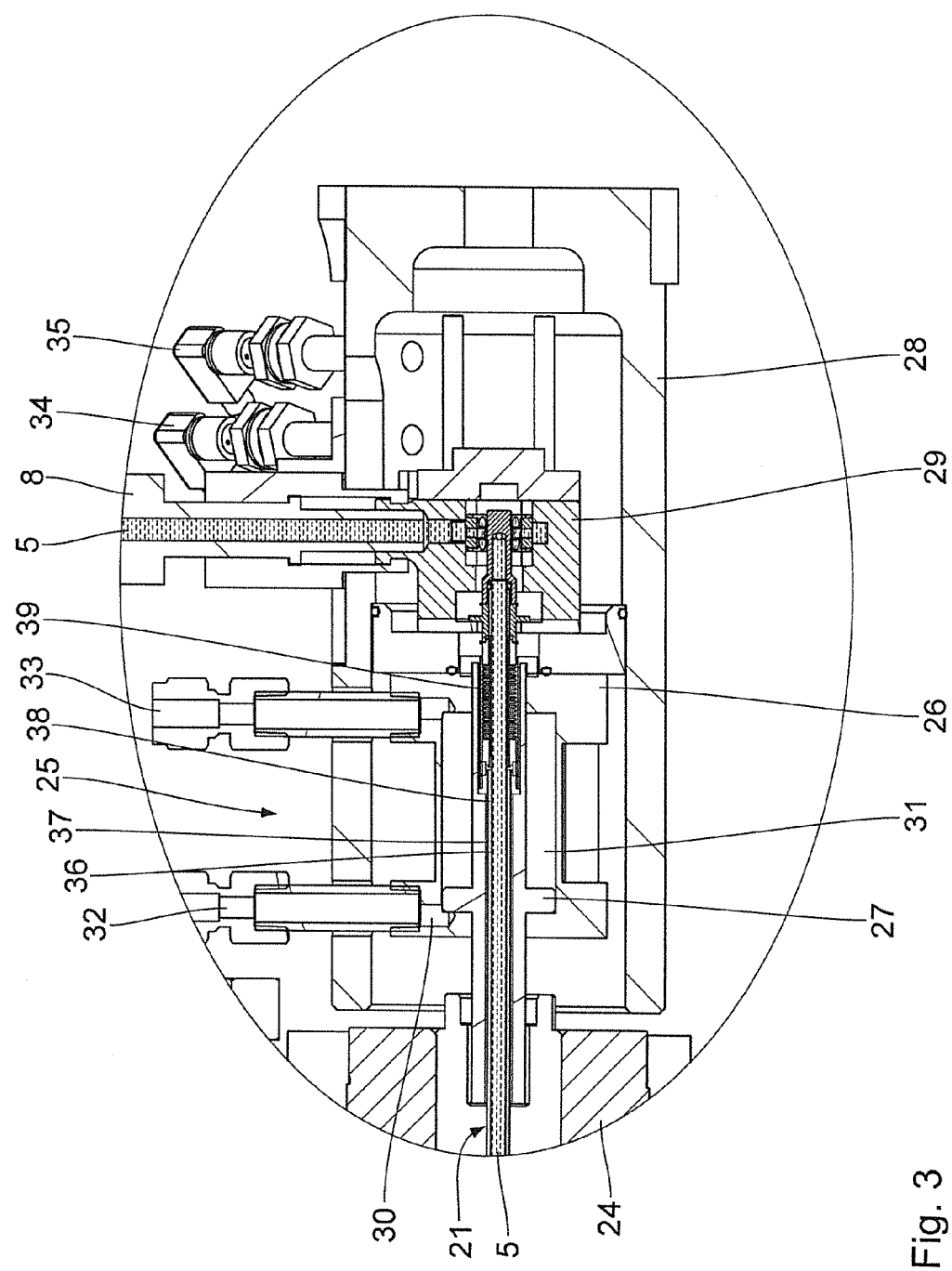
FIG. 3 is a detail view of the portion of the tool turret in the ellipse of FIG. 2 in the area of a linear actuator for moving a first feed line for the cryogenic cooling medium.

FIG. 2 shows a cross section of the lower tool 20 located in a work position. The tool turret 3 completely equipped with tools 20 is shown only in FIG. 1. For the sake of clarity, not all tools 20 are shown in FIGS. 2 to 6.

In order to feed the cryogenic cooling medium 5 from the supply line 8 to the tools 20, the tool turret 3 has a first feed line 21 that is designed with thermal insulation. The first feed line 21 is mounted parallel to and at a distance from the axis of rotation 15 outside the housing 11. For this purpose, the feed line 21 is surrounded with a protective pipe, which on its end is fastened to the fastening sections 23, 24 of housing 11. The feed line 21 is guided through these fastening sections 23, 24. The feed line 21 is also acts as a lance.

The feed line 21 can be moved in a linear manner parallel to the axis of rotation 15 by means of a linear actuator 25. The linear actuator 25 is designed as a double-acting piston-cylinder unit with a cylinder 26 that contains a piston 27. The piston-cylinder unit 25 is mounted in a connection housing 28 that is fastened on the fastening section 24. The supply line 8 is guided in the connection housing 28 and is connected to the first feed line 21 by means of a connecting unit 29. The feed line 21 is connected to the piston 27 and is moved by it. The piston 27 divides the working chamber of the piston-cylinder unit 25 into two partial working chambers 30, 31 that are each in communication with a connection 32, 33 for coupling a hydraulic fluid to the chambers 30, 31. In this way, both partial operating chambers 30, 31 can be filled with the hydraulic fluid and thus the piston can be moved axially in both directions. Two sensors such as induction switches 34, 35 are also mounted on the connection housing 28, in order to detect the position of the piston-cylinder unit 25. The piston-cylinder unit 25 can be operated pneumatically or hydraulically.

To prevent unintended heating of the cryogenic cooling medium 5 in the first feed line 21, it is designed with vacuum insulation. For this purpose, the feed line 21 has an inner pipe 36 and an outer pipe 37 surrounding it that are connected to each other at the end and define between them an insulation chamber 38. The insulation chamber 38 is evacuated so that the feed line 21 has an extremely low specific heat conductivity. A metal boot 39 with a pleated outer surface is integrated into the outer pipe 37 so that the outer pipe 37 can change in length. The metal boot 39 is used for the compensation of different length changes of the pipes 36, 37 as a result of the cryogenic cooling medium 5.

If the first feed line has the cryogenic cooling medium flowing through it, the inner pipe essentially assumes its temperature, while in contrast the outer pipe cools clearly less because of the insulation medium arranged between the two pipes. Thus, the inner pipe changes its length more than the outer pipe. In order to prevent damage of the first feed line, at least one of the pipes must have a changeable length. Preferably the outer pipe has a pleated metal boot for thermal length compensation. The insulation space 38 defined by the pipes may be filled, for example, with an insulation medium. However, if the first feed line 21 is designed so that it is vacuum-insulated, the insulation space 38 is evacuated, the feed line has an extremely low specific heat conductivity. The first feed line may have a specific heat conductivity at 0° C. of max. 0.40 watts per meter Kelvin [W/(mK)], especially of max. 0.30 W/(mK), and especially of max. 0.20 W/(mK). If the first feed line is designed so that it is vacuum-insulated, its specific heat conductivity is extremely low and at 0° C. is maximum 0.01 W/(mK). Preferably the second feed lines are also thermally insulated, at least in sections, and may be vacuum-insulated. The description of the first feed line may also apply to the second feed lines.

For movement, the first feed line 21 is mounted in a fastening section 23 lying opposite the piston-cylinder unit 25 so that it can slide axially. For this purpose, opposite bores 40, 41 are designed in the fastening section 23 and in each bore two gaskets 42, 43 and 44, 45, respectively, are mounted. The gaskets in each bore are separated by a spacer sleeves 46, 47, respectively. A connecting element 48 with a sliding sleeve 49 is mounted between a protective pipe 22 and the fastening section 23. The first feed line 21 is guided through these elements. The connecting element 48 is fastened on the fastening section 23 and the protective pipe 22. The gaskets 42 to 45 are manufactured from a chemically resistant and thermally insulating material, for example, PTFE (polytetrafluoroethylene). The spacer sleeves 46, 47 and the sliding sleeve 49 are also designed of a chemically resistant and thermally insulating material, for example, PTFE.

In the rotating part 13, several second feed lines 50 are provided that lead from the face 51 of the rotary part 13 that faces the first feed line 21 to the tool mounts 19. The second feed lines 50 each have a first line section 52 running parallel to the axis of rotation 15 and a second line section 53 that extends perpendicularly and/or radially to the axis of rotation 15. The first line sections 52 are each designed by two insert parts 54, 55 that are installed in a though-hole 56 designed in the first feed line 21 in the rotary part 13. The respective though-hole 56 narrows in the direction of the first feed line 21 in steps so that the first insert part 54 is fixed in the though-hole 56 adjacent to a respective introduction opening 57 for the feed line 21. On one side of the first insert part 54 that is opposite the first feed line 21, a ring-shaped gasket 58 is mounted that is fixed between the two insert parts 54, 55 by the second insert part 55 introduced into the though-hole 56. The second insert part 55 is in turn fixed by the step-shaped design of the though-hole 56 in the direction of the first feed line 21.

The first insert part 54 is designed with a ring shape and narrows in the direction of the second insert part 55 in the form of a funnel so that the first feed line 21 can be introduced through the gasket 58 in a simple manner. In the second insert part 55, a pocket hole 59 is designed on a side turned toward the feed line 21, which together with the first insert part 54 and the gasket 58 forms a line section 52. For alignment of the first line section 52 relative to the first feed line 21, on the fastening section 23 a guide projection 60 is formed that engages with a guide groove 61 designed opposite it on the rotating part 13. The guide groove 61 is designed with a ring shape and designed concentrically with respect to the rotary axis 15 on the face side 51. The insert parts 54, 55 and the gasket 58 are made of a chemically resistant and thermally insulating material. For example, PTFE is suitable as a material.

The second line section 53 is designed so that it is vacuum-insulated and is similar to the first feed line 21 in that it has an inner pipe 62 and an outer pipe 63 that surrounds it which are connected to each other at the end and which between them form an insulation chamber 64. The insulation chamber 64 is evacuated, whereby the second line sections 53 each have an extremely low specific heat conductivity. Similar to the first feed line 21, the second line sections 53 can make possible a compensation of the different length expansions of the pipes 62, 63 by the provision of a pleated section in one of the pipes. The second line sections 53 each run from the associated pocket hole 59 in the radial direction to the associated tool mounts 19 and/or tools 20. The tools 20 each have a holding chamber 65 coupled to a respective second line section 53 for the cryogenic cooling medium 5. From the respective holding chamber 65, a cooling channel 66 runs through the tool 20 to the tool blade 67 which is provided with an outlet opening 68 through which the cryogenic cooling medium 5 can escape.

Because of the fact that the first feed line 21 is at a distance from the axis of rotation, i.e. preferably outside the housing 11, the second feed lines 50 can be designed so they are extremely short.

Because of the fact that the respective first line section 21 runs parallel to the axis of rotation, the first feed line can be connected to the respective second feed line 50 by a simple linear movement. Since the respective second line section 53 runs perpendicularly and/or radially with respect to the axis of rotation 15, the cryogenic cooling medium is supplied directly up to the blades 67 of the tools.

Figure 4:
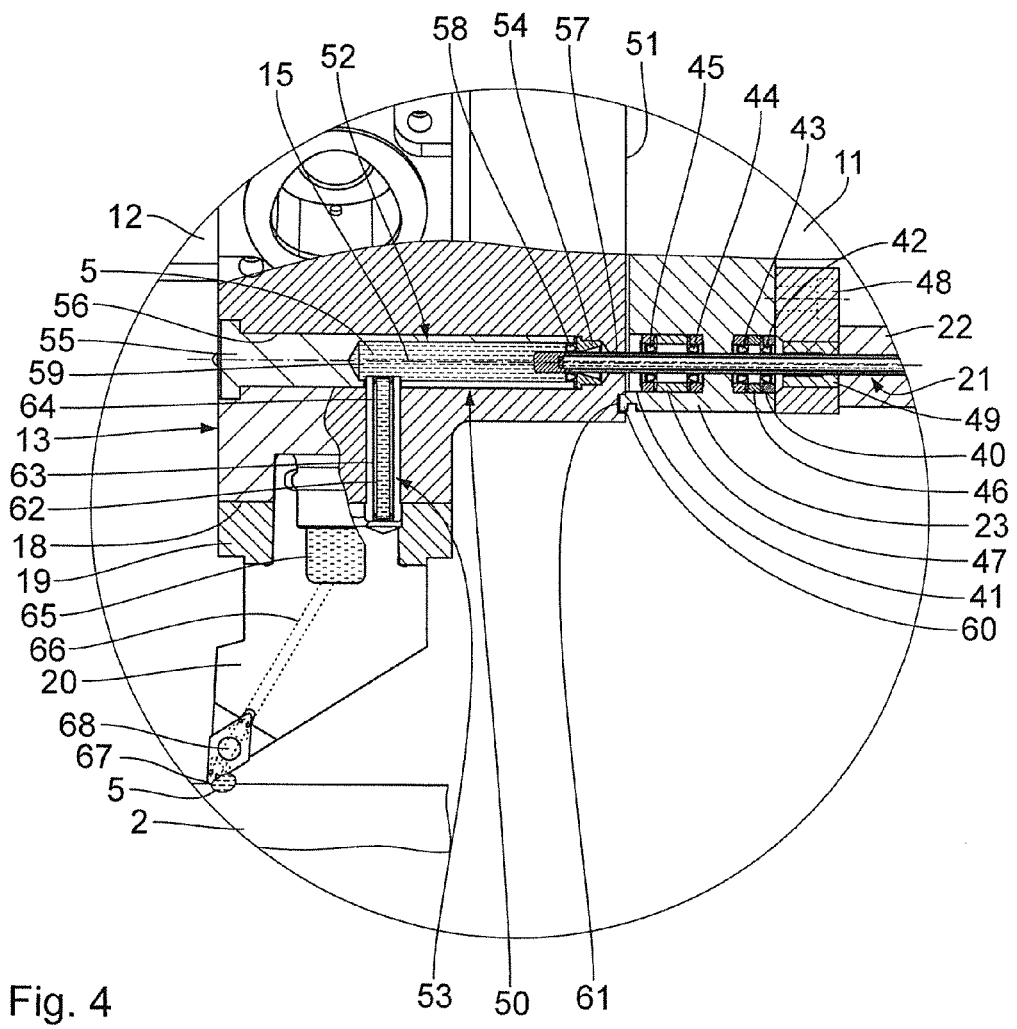
FIG. 4 is a detail view of the portion of the tool turret in the circle of FIG. 2 in the area of a connecting point between the first feed line and a second feed line for feeding the cryogenic cooling medium to the tool located in work position.

Machining of a workpiece 2 will be described in the following. For machining, by means of the piston-cylinder unit 25, the first feed line 21 is introduced into the first line section 52 of the tool 20 found in the work position in such a way that the cryogenic cooling medium 5 from the first feed line 21 enters the pocket hole 59. This first position of the first feed line 21, which is also designated as the operating position, is shown in FIG. 4. In the operating position, the first feed line 21 is connected to the second feed line 50 assigned to the tool 20 found in the work position for transferring the cryogenic cooling medium 5 to the tool plate 67. Then the workpiece 2 is rotated in the usual manner and machined with the tool 20. During the machining, the cryogenic cooling medium 5 is pumped by means of the feed pump 7 through the feed lines 21, 50 to the outlet opening 68, where the cryogenic cooling medium 5 escapes directly at the tool blade 67.

The cryogenic cooling medium 5 is, e.g. liquid nitrogen that is provided below its evaporation temperature in the reservoir 4 and held at the desired temperature by means of the cooling unit 6. For feeding the cryogenic cooling medium, the shutoff valve 9 is opened so that the feed pump 7 can feed the cryogenic cooling medium 5 from the reservoir 4 by way of the supply line 8 to the tool turret 3. Since the feed lines 21, 50 are designed so that they are thermally insulating and/or vacuum-insulated, the cryogenic cooling medium 5 essentially does not warm up by flowing through the feed line 21, 50. The cryogenic cooling medium 5 escapes through the outlet opening 68 at a temperature of less than −180° C. After escape, the cryogenic cooling medium evaporates so the machining of the workpiece 2 occurs under dry conditions and the workpiece 2 and the entire machine tool are not contaminated.

Figure 5:
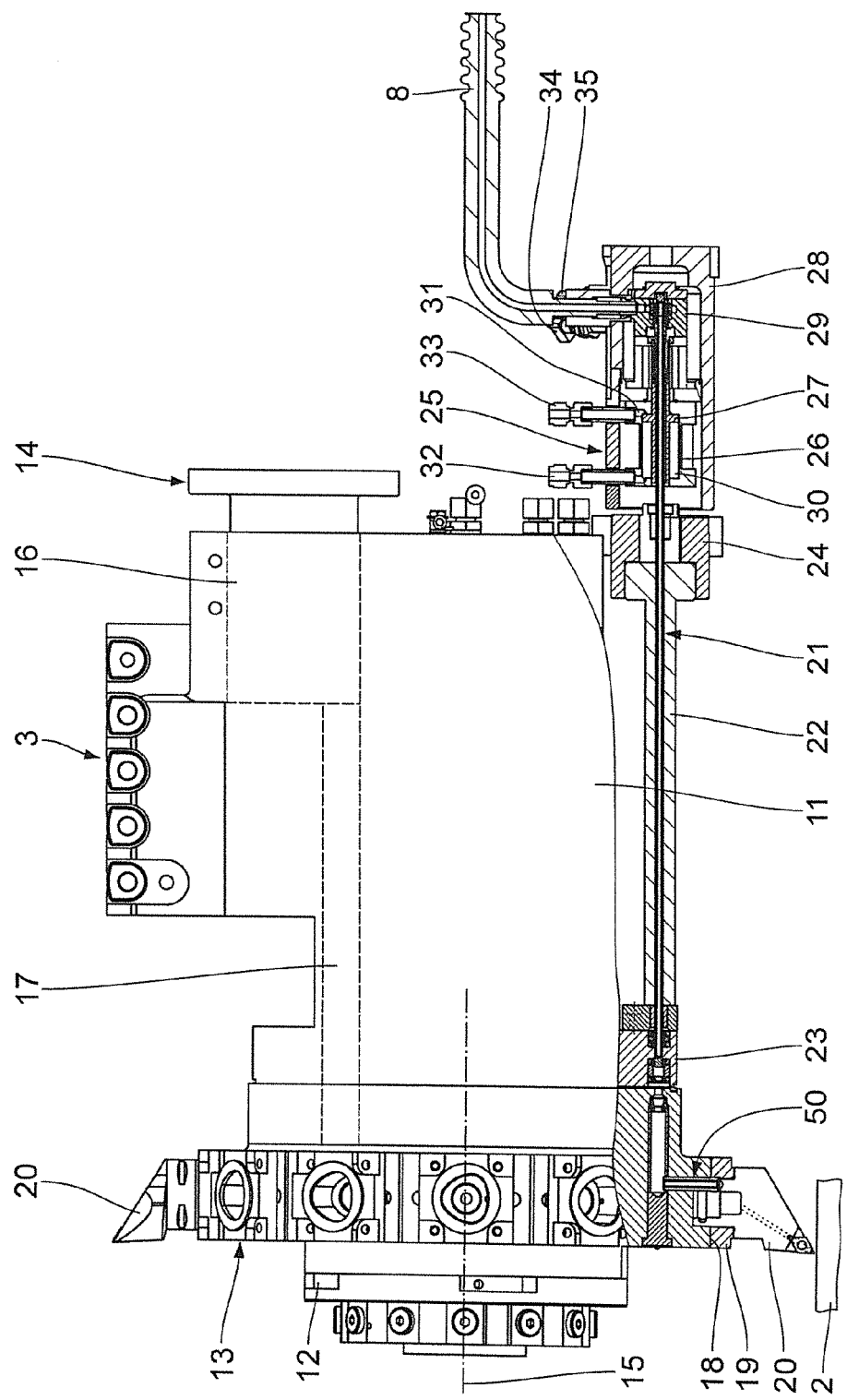
FIG. 5 is a side view partly in section of the tool turret in a tool change position.
Figure 6:
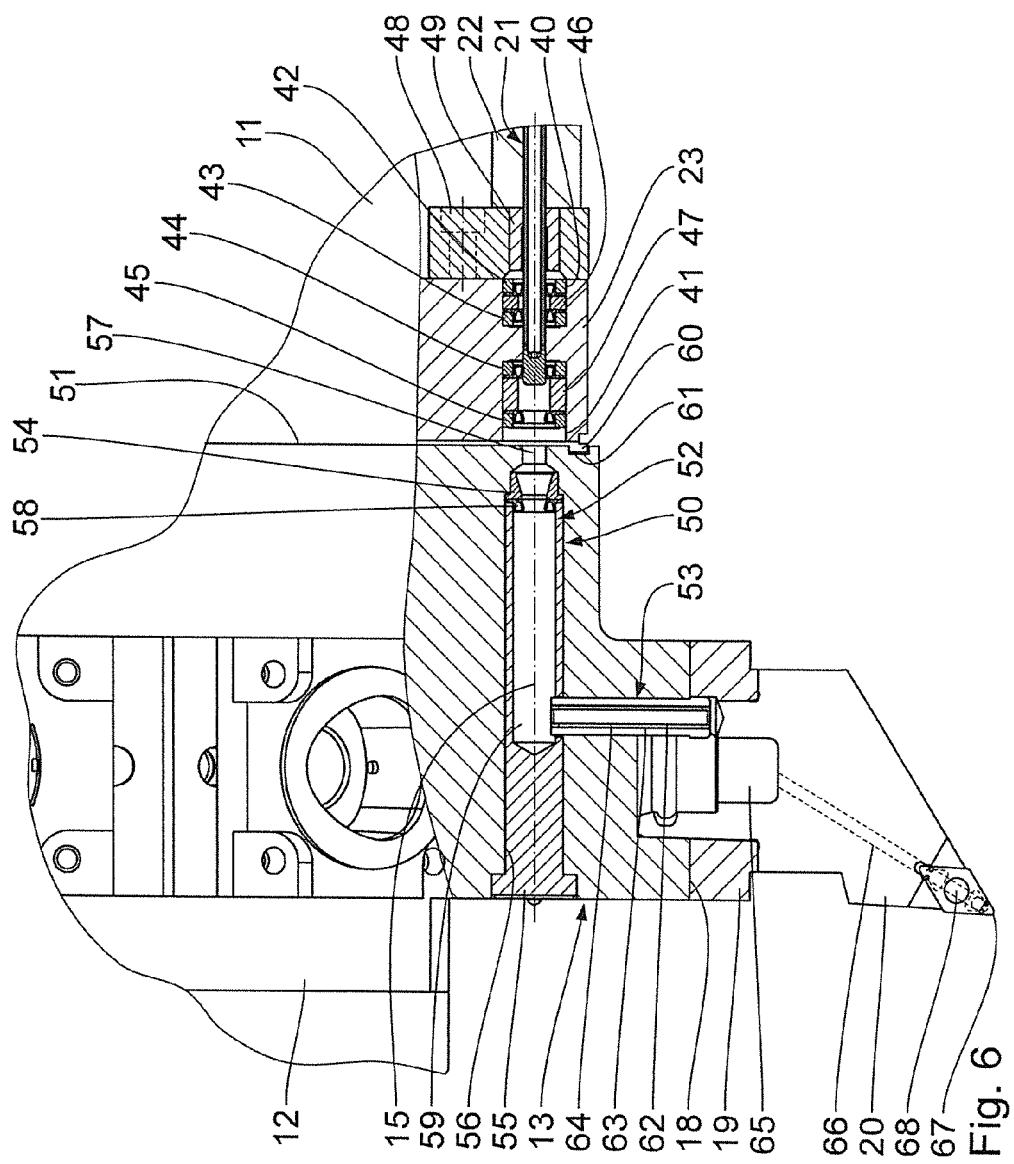
FIG. 6 is a detail view of the tool turret in FIG. 5 in the area of the separate feed lines.
Figure 7:
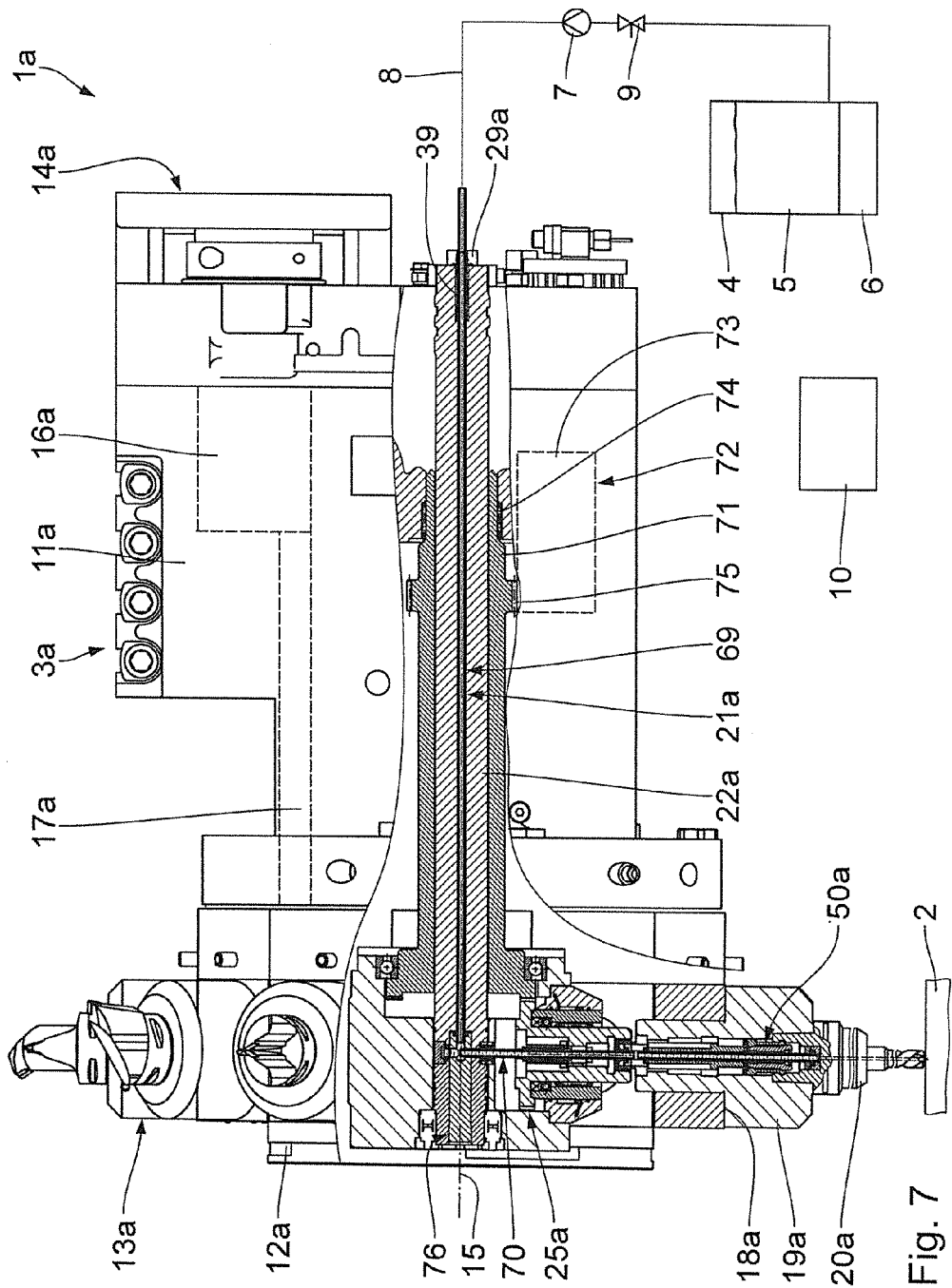
FIG. 7 is a side view of a second embodiment of the invention showing a tool turret in an operating position for feeding the cryogenic cooling medium.

For the tool change, the supply of the cryogenic cooling medium 5 is interrupted by shutoff of the feed pump 7 and shutting off the shutoff valve 9. Then the first feed line 21, together with the connecting unit 29 and the supply line 8 connected with it, is moved by means of the piston-cylinder unit 25 so that the first feed line 21 is removed from the first line section 52. In the second position of the first supply line 21, it is disconnected from all second feed lines 50 so the rotary position of the rotating part 13 can be changed. This second position that is also designated as the tool change position is shown in FIGS. 5 and 6.

For the tool change, the rotating part 13 is rotated around the axis of rotation 15 into its other rotary position by means of the drive unit 14 to position another tool 20 in the work position. Then by means of the piston-cylinder unit 25 the first feed line 21 is introduced into the first line section 52 again, whereby the introduction is made easy due to the funnel-shaped insert part 54. The first feed line 21 is now located again in the operating position so that the machining of the workpiece 2 can be continued with feed of the cryogenic cooling medium 5.

At the outlet from the respective tool, the cryogenic cooling medium has a temperature of less than −60° C., and may be less than −120° C., and may be less than −150° C., and may be less than −180° C. As cryogenic cooling medium, for example liquid or gaseous nitrogen, liquid or gaseous oxygen, gaseous hydrogen, gaseous helium, liquid or gaseous argon, gaseous carbon dioxide and liquid or gaseous natural gas can be used. Preferably nitrogen is guided through the feed lines to the tools. In addition a non-cryogenic cooling lubricant can also be supplied through the tool turret to the respective tool.

A second embodiment of the invention is described with reference to FIGS. 7 to 11. Parts in the second embodiment that are identical in construction to parts in the first embodiment have the same reference numbers as in the first embodiment to which reference is hereby made. Parts that have different construction but are functionally the same have the same reference number with an a behind it. The tool turret 13a of the machining system 1a is designed for the rotary driving of tools 20a. For this purpose, the tool holders 19a are rotatable, whereby in the tool holders 19a both tools 20a can be used that are rotary driven for machining and also tools 20a can be used that do not have to be rotary driven for machining, i.e., they remain stationary. In FIGS. 7 to 11, a tool holder 19a is located in the work position with a tool 20a designed as a drill that must be rotary driven for machining the workpiece 2. In the other tool holders 19a, there are also tools 20a designed as lathe chisels that are stationary when machining the workpiece 2.

The first feed line 21a has a first line section 69 mounted concentrically to the axis of rotation 15 and a second line section 70 mounted perpendicularly and/or radially with respect to the axis of rotation 15. The first line section 69 is designed with vacuum insulation corresponding to the first feed line of the first embodiment. The first line section 69 is surrounded by the protective pipe 22a, which in turn is surrounded by a drive shaft 71 that is part of a second drive unit 72 with an associated drive motor 73. The drive shaft 71 is mounted on both ends by means of bearing 74 on the housing 11a so that it can rotate and by means of the drive motor 73 can be rotary driven around the axis of rotation 15 by a first gear 75. In the axial direction, the first line section 69 is not movable.

The first line section 69 is connected by means of a connecting unit 76 that is part of the feed line 21a to the second line section 70. The connecting unit 76 comprises a sleeve 77 that is introduced into a hole 78 that is designed in the central shaft 12a concentrically to the axis of rotation 15, into which the protective pipe 22a also extends with the first line section 69. The sleeve 77 is arranged at a distance in the axial direction from the protective pipe 22a so that a clearance 79 is formed. In the sleeve 77, an insert part 80 belonging to the connecting unit 76 is inserted that extends up to the protective pipe 22a. On a side turned toward the line section 69, the insert part 80 has a pocket hole 81 formed with a stepped shape in which on the end a ring-shaped gasket 82 is fastened through which the first line section 69 is partially introduced into the pocket hole 81. The insert part 80 also has a though-hole 83 that leads in the radial direction through the free part of the pocket hole 81 and opens out on both sides into the clearance 79. At each end of the though-hole 83, a ring-shaped gasket 84 is arranged. The second line section 70 is guided through the gasket 84 and/or the gaskets 84 and the though-hole 83. Adjacent to the end of the second line section 70, in the open space 79 an elastic buffer element 85 is mounted.

The second line section 70 can be moved in a linear manner by means of the linear actuator 25a radially with respect to the axis of rotation 15. The linear actuator 25a is designed similar to the first embodiment as a piston-cylinder unit. The cylinder 26a is formed by the central shaft 12a and an outer guide sleeve 86 fastened to it. An inner guide sleeve 87 is mounted in the outer guide sleeve 86, and a first drive part 88 is mounted on the inner guide sleeve 87. The inner guide sleeve 87 and the drive part 88 form the piston 27a. The inner guide sleeve 87 can be moved with a limited stroke in the outer guide sleeve 86 in a linear manner, perpendicularly and/or radially with respect to the axis of rotation 15. For this purpose, the piston 27a divides the working chamber into two partial working chambers 30a, 31a. The partial working chambers 30a, 31a can be filled in a manner similar to the first embodiment by way of connections that are not shown in more detail with a pressure medium so that the piston 27a can be moved in both directions. By means of a sealing bearing 89, the drive part 88 can be rotated radially with respect to the tool axis of rotation 90 running radially to the axis of rotation 15 in the inner guide sleeve 87. For rotary driving of the drive part 88, the drive shaft 71 has a second gear 91 on its end that by movement of the piston 27a can be brought into engagement with a gear mounted on the circumference 92 of the drive part 88.

The second line section 70 is guided through a though-hole 93 of the drive part 88 and by means of bearing elements 113, 114 coupled with it in such a way that the second line section 70 can be moved along the tool axis of rotation 90 with the piston 27a, but with a rotation of the drive part 88 around the tool axis of rotation 90 it is fixed. For this purpose, the bearing elements 113, 114 are designed as slide bearings, which rotate together with the drive part 88 around the second line section 70 fixed by means of the connecting unit 76. The second line section 70, corresponding to the first line section 69, is designed with vacuum insulation. For this purpose, the second line section 70 has an inner pipe 94 that is surrounded by an outer pipe 95. The pipes 94, 95 that are connected to each other at the end define an insulation space 96 that is evacuated. For compensation of a different length expansion of the two pipes 94, 95, a pleated metal boot 97 is formed in the outer pipe 95.

For rotary driving of the tool 20a around the associated tool axis of rotation 90, two drive parts 98 are mounted in the rotating part 13a so that they can be rotated. The drive parts 98 form the tool holder 19a for the tools 20a. The respective second drive part 98 has a though-hole 99 in which the second feed line 50a is mounted concentrically to the tool axis of rotation 90. For this purpose, the second feed line 50a is partially surrounded by a protective pipe 100, which in turn is partially surrounded by a first insert part 101 which is partially introduced into the though-hole 99 so that they rotate together. On a projecting section of the insert part 101, an outer gearing 102 is mounted which can be brought into engagement with an inner gearing 103 of the first drive part 88. On the end facing the second line section 70, a second insert part 104 is introduced into the insert part 101, by means of which two ring-shaped gaskets 105, 106 are fixed. The insert part 104 forms a part of the second feed line 50a. The second feed line 50a is fixed in the drive part 98 in such a way that it cannot move along the tool axis of rotation but is mounted so that it can rotate relative to the drive part 98.

In the though-hole 99, the tool 20a is fastened by means of a tensioning element 107. The second feed line 50a leads up to the holding chamber 65a in which it is mounted by means of two bearing elements 108, 109 and a gasket 110 lying between them. The insert part 104, the protective pipe 100 and the bearing elements 108, 110 are designed as slide bearings in order to rotate the tool holder 19a with the tool 20a and the insert part 101. From the holding chamber 65a, the cooling channel 66a leads to the tool blade 67a where the cryogenic cooling medium 5 can escape through the outlet opening 68a. Thus, the drive part 98 forms the rotary-drivable tool holder 19a for the tool 20a.

Figure 9:
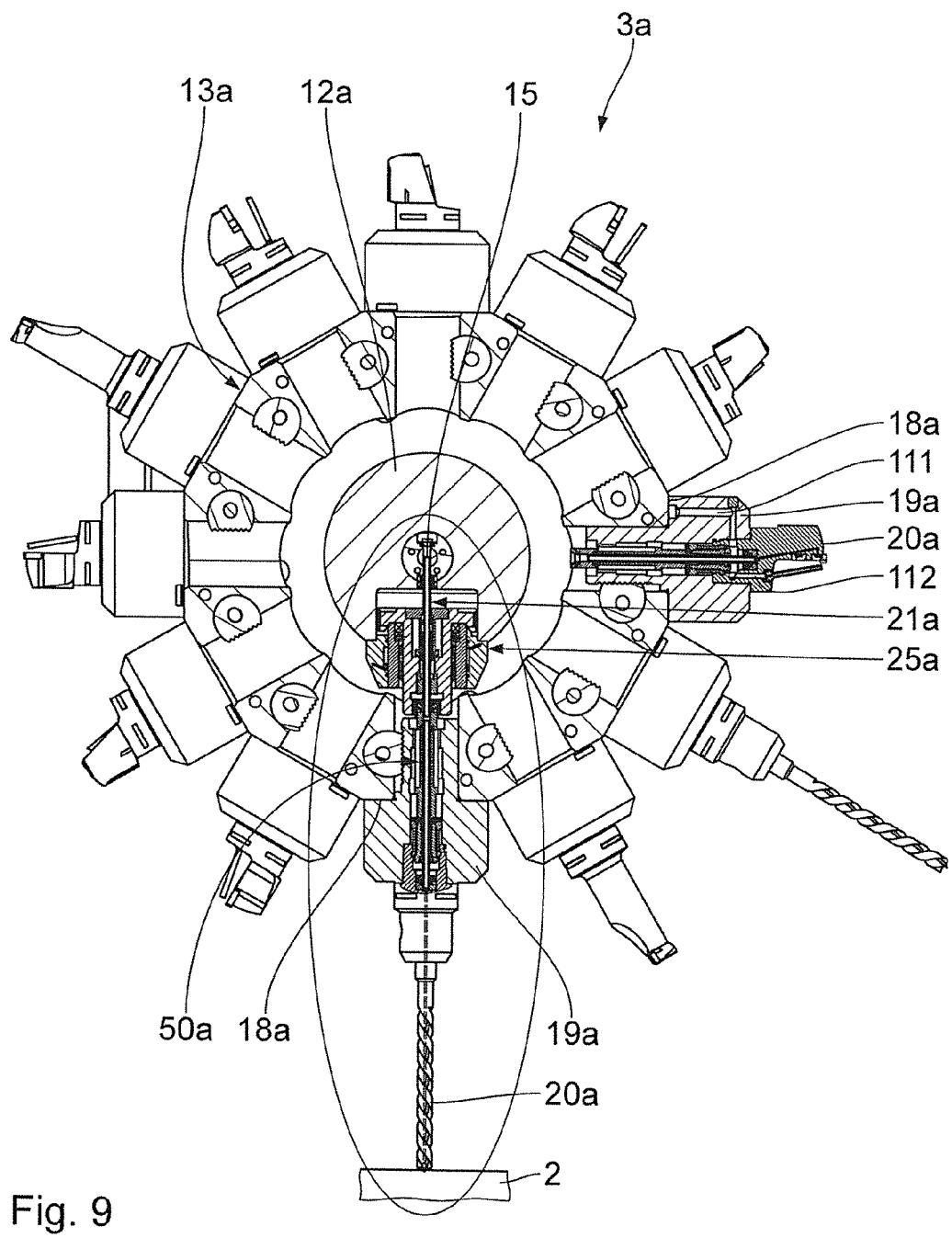
FIG. 9 is a front view partly in section of the tool turret in FIG. 7.

In addition, individual ones or all the drive parts 98 in addition to the associated tool 20a may be provided with a cooling channel 111, 112 for a minimum quantity lubrication. This is shown in FIG. 9 on an individual drive part 98 and the associated tool 20a. Tool holders 19a of this type can thus also be operated with a conventional tool turret with minimum quantity lubrication.

The second feed line 50a is designed so that it is vacuum-insulated and, corresponding to the first feed line 21a, has an inner pipe 62 that is surrounded by an outer pipe 63. The pipes 62, 63 are connected to each other at the end and between them define an evacuated insulation chamber 64. In addition, the outer pipe 63 can be designed with a pleated metal boot that is used to compensate the different length expansions of the pipes 62, 63.

The connecting unit 76, the gaskets 82, 84, the buffer element 85, the insert parts 101, 104, the protective pipe 100, the gaskets 105, 106, 110 and the bearing elements 108, 109, 113, 114 are designed of a material that is chemically resistant to the cryogenic cooling medium 5 and thermally insulating. For example, PTFE may be used as the material.

Because of the design of the first feed line 21a, only the second line section 70a is moved perpendicularly and/or radially with respect to the axis of rotation 15 by means of the linear actuator 25a. The first line section 69 that runs concentrically to the axis of rotation is mounted fixed in the axial direction. Since neither the first line section 69 nor the second line section 70 is formed in the rotating part, these are also fixed during a rotation of the rotating part. Because of the arrangement of the first feed line 21*a*, the structure of the tool turret 13*a* is extremely compact.

Because of the fact that the second feed lines each run exclusively perpendicularly and/or radially with respect to the axis of rotation, the cryogenic cooling medium can be guided directly to the blades of the tools.

Figure 8:
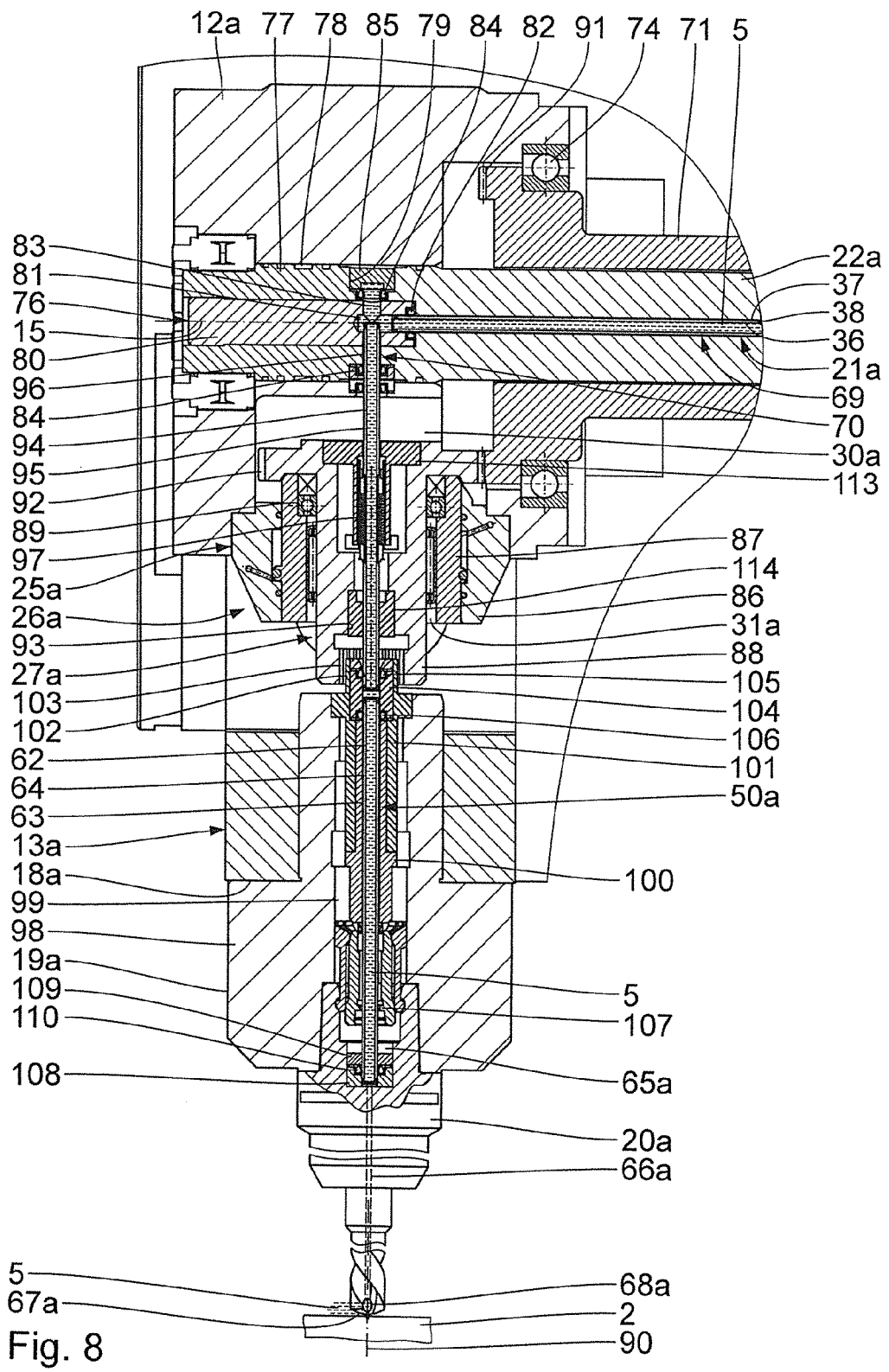
FIG. 8 is a detail view of a portion of the tool turret in FIG. 7 in the area of the connecting point between the first feed line and the second feed line assigned to the tool found in the work position.
Figure 10:
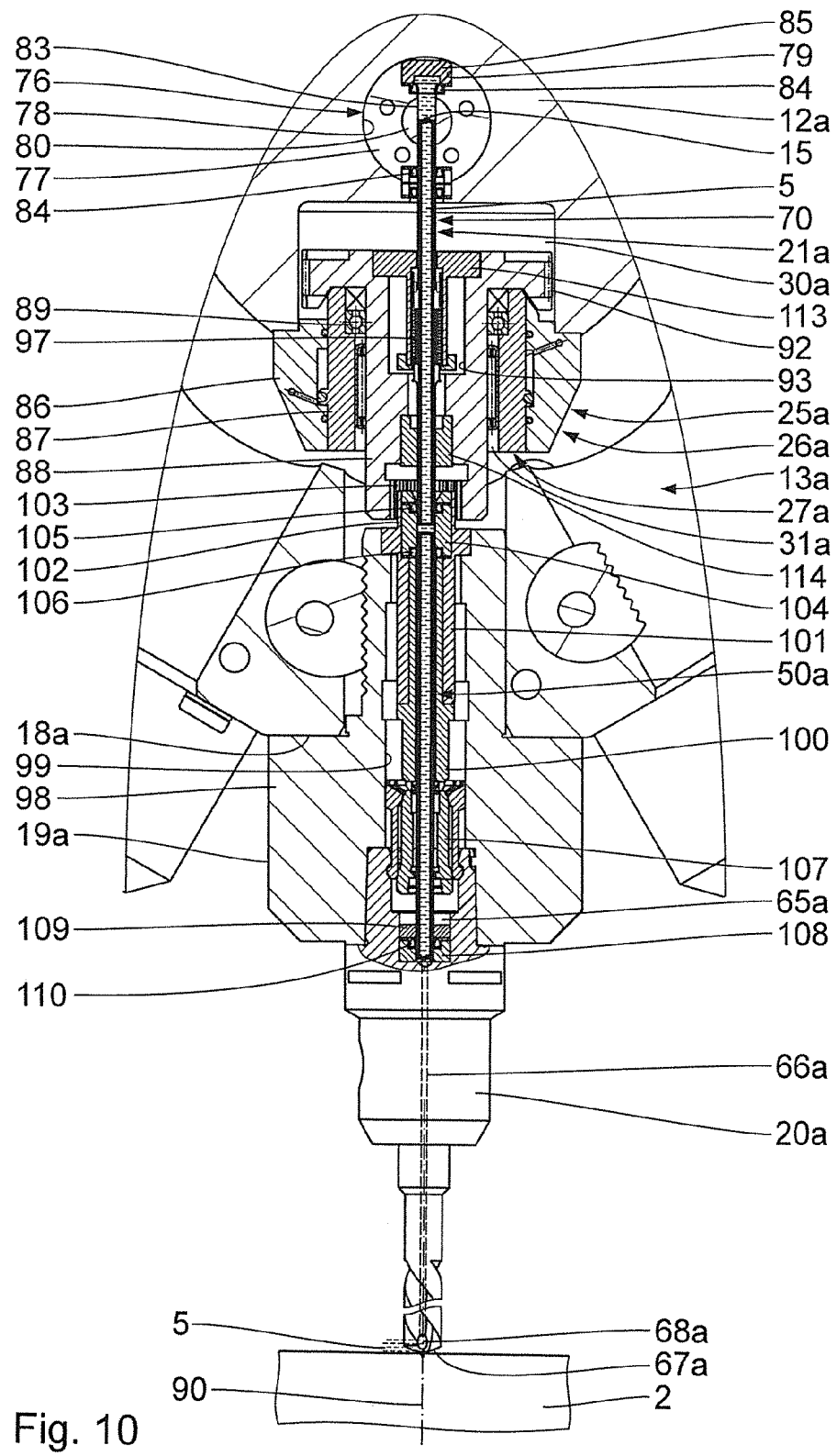
FIG. 10 is a detail view of the tool turret in the ellipse of FIG. 9 in the area of the connecting point.

For machining a workpiece 2 with the tool 20*a* to be rotated, the piston 27*a* is moved parallel to the tool axis of rotation 90. In this case, the gearing 92 comes into engagement with the gearing 91. The tool 20*a* is now rotated by means of the drive unit 72 by way of the drive shaft 71, the first drive part 88 and the second drive part 98 in which the tool 20*a* is held. By the movement of the piston 27*a*, the second line section 70 of the feed line 21*a* is also introduced into the introduction opening 57*a* and in this way connected to the second feed line 50*a* of the tool 20*a* located in work position. The introduction is made easier by the funnel-shaped insert part 104. During the rotary driving of the tool 20*a*, the second line section 70 and the respective second feed line 50*a* of the tool 20*a* that is located in the work position is fixed around the tool axis of rotation 90. The cryogenic cooling medium 5 is now fed by way of the feed lines 21*a*, 50*a* and guided through the cooling channel 66*a* to the tool blade 67*a*, where it escapes through the outlet opening 68*a* and cools the tool blade 67*a* during the machining of workpiece 2. This first position in which the first feed line 21*a* is connected to the second feed line 50*a* is shown in FIGS. 8 and 10.

Figure 11:
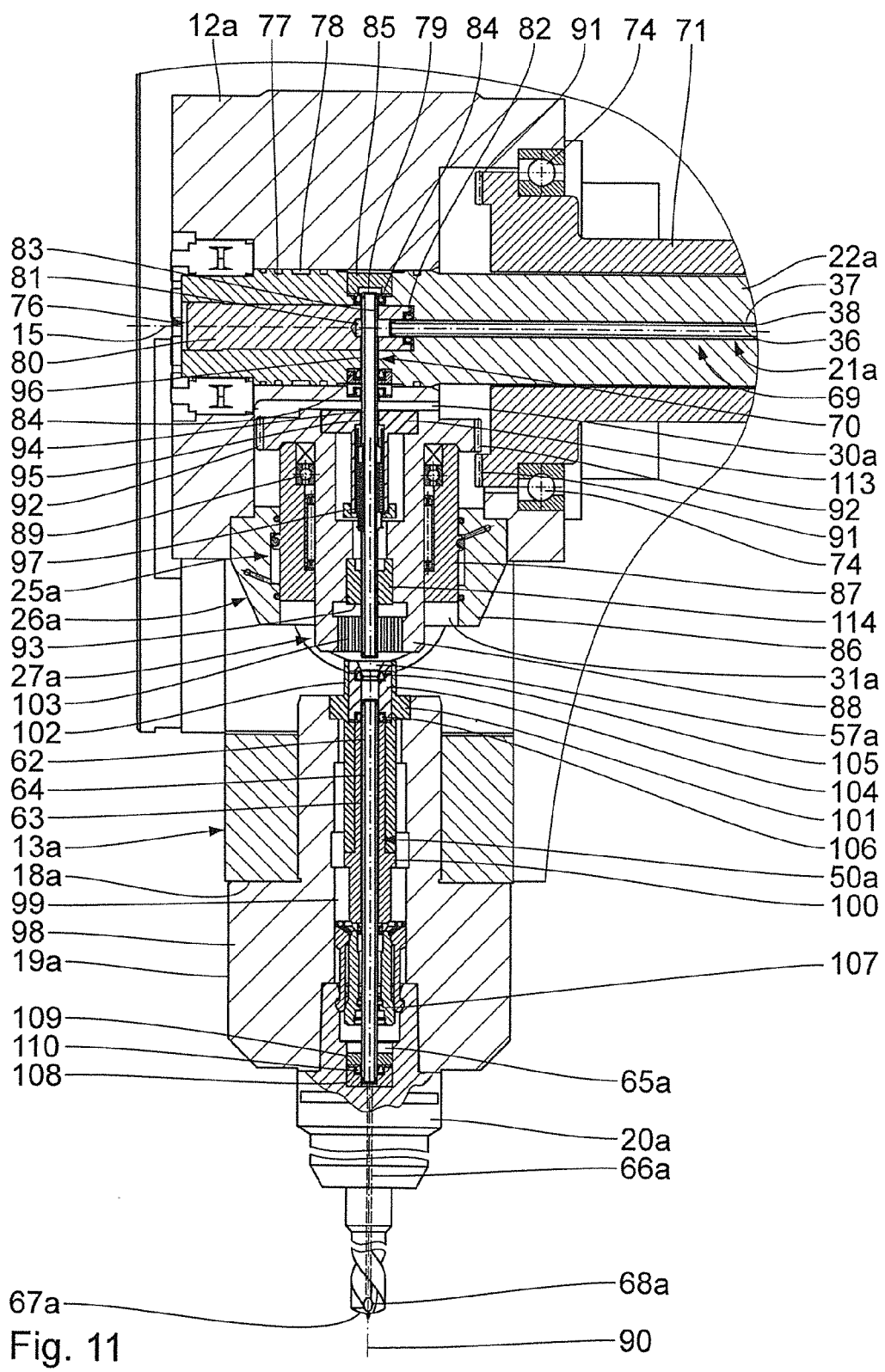
FIG. 11 is a sectional side view of the tool turret in the tool change position showing the disconnected feed lines.

For the tool change, the rotary driven tool 20*a* is first stopped, then the piston 27*a* is moved parallel to the tool axis of rotation 90 so that the second line section 70 is removed from the second feed line 50*a* and the gearing 92 is no longer in engagement with the gearing 91. This second position in which the feed line 21*a* is disconnected from the second feed line 50*a* is shown in FIG. 11. The rotary part 13*a* can now be swung around the axis of rotation 15 into a new rotary position by means of the drive unit 14*a*, in which a new tool 20*a* is located in the work position. Then the piston 27*a* is moved again in the direction of the tool 20*a* until the gearing 92 is in engagement with the gearing 91 and the second line section 70 is introduced into the introduction opening 57*a*. The machining can now be continued in the manner already described with the new tool 20*a* when this is to be rotary driven. If the new tool 20*a* must be stationary for machining, in the manner described above the cryogenic cooling medium 5 is supplied but the drive part 98 is not rotary driven by means of the drive unit 72. In this case, the drive unit 72 or another mechanism for fixing and/or clamping the tool holder 19*a* can be used so that the associated tool 20*a* is fixed around the tool axis of rotation 90.

With respect to the further structure and the other functioning methods, reference is made to the first embodiment described above.

With the machining system 1, 1*a* according to the invention, e.g., titanium alloys, cast iron with laminar graphite, cast iron with spherical graphite or other materials that are hard to machine can be machined. Shafts like pinion shafts, crankshafts, camshafts, gearshift shafts or other shaft-shaped components can be machined as workpieces 2 as well as flange parts and bearing wheels. By means of the machining system 1, 1*a*, the workpieces 2 can be machined by turning, milling, cold rolling, gear cutting, drilling, crankshaft and/or camshaft milling or grinding.

Because of the fact that the cryogenic cooling medium is supplied directly up to the cutting edge of the tools, and the tools are effectively cooled because of the extremely low temperature of the cryogenic cooling medium, higher cutting speeds during workpiece machining are possible in comparison to the usual cooling lubricants. In addition, the cryogenic cooling medium has a positive effect on the service lives of the tools. The productivity and cost-effectiveness of the workpiece machining can be increased by the supply of the cryogenic cooling medium to the cutting tools. Since the cryogenic cooling medium evaporates, neither the machined workpieces nor the tool turret and/or the entire machine tool becomes soiled. Disposal of the cryogenic cooling medium as is required with the usual cooling lubricants is no longer necessary, whereby the cost-effectiveness of the workpiece machining is even further improved.

The invention claimed is:

1. A tool turret for machining workpieces, the tool turret comprising:
a housing;
a drive unit mounted on the housing;
a rotary part having an axis of rotation and a plurality of tool holders arranged on a circumference of the rotary part for holding tools, which rotary part can be rotated relative to the housing around the axis of rotation into a plurality of rotary positions by means of the drive unit;
a first feed line for feeding a cryogenic cooling medium to the tools in a direction parallel to the axis of rotation, which parallel feeding occurs at least in sections of the first feed line; and,
a plurality of second feed lines coupled to the tools for feeding the cryogenic cooling medium to the tools in a direction that is perpendicular to the axis of rotation, which perpendicular feeding occurs in at least part of each of the second feed lines,
wherein at least sections of the first feed line can be moved in a linear manner parallel to the axis of rotation by means of a linear actuator between a first and a second position; whereby
the first feed line in the first position is connected to one of the second feed lines for transferring the cryogenic cooling medium from the first feed line to the one second feed line, and,
the first feed line in the second position is separated from the second feed lines to allow a change to the rotary position of the rotary part; and
wherein the first feed line includes an inner pipe and an outer pipe surrounding the inner pipe so as to define an insulation chamber between the inner pipe and the outer pipe, and wherein the outer pipe includes a pleated section within the linear actuator so that the outer pipe can change in length.

2. Tool turret according to claim 1,
wherein the insulation chamber provides thermal insulation for the first feed line, and wherein the insulation chamber comprises a vacuum insulation chamber.

3. Tool turret according to claim 1,
wherein the pleated section is a metal pleated section.

4. Tool turret according to claim 1, wherein the second feed lines are each thermally insulated at least in sections and are vacuum-insulated.

5. Tool turret according to claim 1, wherein the linear actuator is a double-acting piston-cylinder unit that can move axially in opposite directions and is coupled with the first feed line.

6. Tool turret according to claim 1, wherein the second feed lines each have a funnel shape at their ends that are proximate the first feed line and also each have a gasket which forms a seal against the first feed line when the first feed line is connected to one of the second feed lines.

7. Tool turret according to claim 6, wherein the second feed lines each have a first section wherein a feed direction of the cryogenic cooling medium therethrough runs parallel to the axis of rotation and a second line section wherein a feed direction of the cryogenic cooling medium therethrough runs perpendicularly to the axis of rotation.

8. Tool turret according to claim 1, wherein the first feed line is mounted at a distance from the axis of rotation of the rotary part.

9. Tool turret according to claim 1 further comprising:
   a thermally insulated reservoir for providing a cryogenic cooling medium,
   a cooling unit for cooling the cryogenic cooling medium, and
   a thermally insulated supply line for feeding the cryogenic cooling medium from the reservoir to the tool turret.

\* \* \* \* \*